Patented Dec. 24, 1940

2,225,919

UNITED STATES PATENT OFFICE 2,225,919

COATING COMPOSITION

George D. Martin, Nitro, W. Va., assignor to Monsanto Chemical Company, St. Louis, Mo., a corporation of Delaware No Drawing. Application April 16, 1937,
Serial No. 137,313

12 Claims. (Cl. 134—39)

The present invention relates to improvements in coating compositions and the process of preparing the same. More particularly, the present invention relates to improvements in coating compositions containing a drying oil, such as paints, varnishes, enamels, linoleums and the like.

Many types of paints, varnishes and enamels containing drying oils exhibit the objectionable property of developing tough rubber-like films across their upper surfaces when allowed to stand for a relatively short time in open containers. Such films are usually called "skins" and the process of developing this "skin" formation is called "skinning." In paints or enamels containing certain types of pigments, as well as in mixtures containing relatively large proportions of China-wood oil or polymerized linseed oil, this tendency to skin is greatly increased with the result that skins may form on the surface of the mixture even in their unopened containers. This tendency to develop skin formation is particularly undesirable in dipping operations, where the coating composition in the container is required to be exposed to the air for considerable periods of time while the articles to be coated by the paint, varnish, enamel and the like are immersed therein. Furthermore, in the manufacture of paints, varnishes or enamels and the like or materials comprising the same, it is usually customary to incorporate therein a small proportion of a positive oxidation catalyst to diminish the time of drying of the oil so that the composition will dry within a reasonable time after it is spread in a thin film. This positive oxidation catalyst is commonly called a dryer or siccative. These dryers or siccatives induce varying forms of oxidation phenomena some of which are highly advantageous and necessary and others which are undesirable and objectionable. Thus, while the dryer or siccative aids in the drying of the film of the coating composition containing the drying oil, it also increases the tendency of the composition to film or skin in the container, and further may catalyze the oxidation process too far during the drying of the coating composition when in the film form.

One object of this invention is to provide a drying oil composition possessing improved properties.

A further object of this invention is to provide a drying oil composition possessing improved resistance to skinning when in the container or in bulk condition.

Another object of this invention is to provide a coating composition comprising a drying oil, and possessing improved properties.

A further object of this invention is to provide a class of materials, which, when incorporated in a drying oil composition, substantially prevents undesirable oxidation of the composition without materially affecting the normal drying rate thereof when flowed or spread on surfaces in a thin film. Other objects will be hereinafter shown.

According to the present invention the undesirable properties of the so-called dryers and the tendency of drying oil compositions, for example paints, varnishes and the like, to develop skins and undesirable oxidation products have been substantially eliminated by the incorporation therein of a small proportion of a halogenated polyhydric phenol. More specifically, the preferred compounds of the present invention comprise halogenated polyhydric phenols containing a single nucleus.

As one method of operating the present invention, portions of a paint, varnish or enamel, which readily skins on contact with the air, were placed in suitable containers, a small proportion of one of the preferred halogenated polyhydric phenols incorporated and observations made at regular intervals as to the skinning of the composition.

As specific embodiments of the present invention, but in no sense limitative of the scope thereof, 20 gram portions of a quick drying enamel comprising a 25 gallon China-wood oil varnish containing 2.5% of a mixed lead manganese and cobalt dryer were placed in separate wide mouth open containers. 20 milligrams of dichlor hydroquinone, mono chlor catechol, chlorinated di-tertiary amyl catechol, amylated dichlor hydroquinone, brom-dichlor hydroquinone, mono brom hydroquinone and dichlor pyrogallol were incorporated therein and a comparison made with the skinning time of the same enamel containing no inhibitor of skin formation, a temperature of 25° C. being maintained throughout the tests. It was noted that, while the enamel which did not contain an inhibitor of skin formation developed a thick skin in one day, even with the small amounts of the preferred class of inhibitors employed in conjunction with the enamel, in no case was a skin formed in eight days. Further tests showed remarkable stability of the enamel containing the preferred class of compounds against skin formation. This property of preventing skin formation is in particular exhibited by the halogenated polyhydric phenols containing a single benzene nucleus wherein the hydroxyl groups are in the ortho or para position to each other. Thus, the 20 gram portions of the above enamel containing 20 milligrams of mono chlor catechol and chlorinated di-tertiary amyl catechol respectively did not develop a skin in 28 days.

Included within the scope of the present invention is the use of halogenated ortho methyl hydroquinone, halogenated di-tertiary amyl hydroquinone and the analogues thereof, and halogenated poly hydroxyl substituted naphthalenes, as for example dichlor 1:5-dioxy naphthalene which has been tested in the manner described above and found to possess strong skin inhibiting properties. Instead of the chlor and brom derivatives of polyhydric phenols hereinbefore set forth, the iodo and fluor derivatives may be employed.

The preferred compounds of the present invention possess the added advantage in that they do not discolor enamels, paints, varnishes and the like, wherein they are incorporated in sufficient quantity to substantially prevent skinning, as do the polyhydric phenols themselves. Furthermore, the preferred compounds, when employed in sufficient quantity to substantially prevent skinning, do not substantially affect the normal drying time of the coating compositions after they have been flowed or painted on surfaces. Thus, a remarkable improvement has been effected over the use of unhalogenated phenols, as for example hydroquinone, catechol and the like in coating compositions.

The preferred compounds of the present invention are more readily soluble in drying oils than the polyhydric phenols themselves and their use in consequence thereof is markedly superior thereto.

A further improvement and advantage in the use of the preferred class of compounds lies in their decreased solubility in water over that of unhalogenated polyhydric phenols, as for example catechol, hydroquinone and resorcinol, which are readily soluble in water. In paints, and in particular in paints which are exposed to weathering in the film form, it is highly undesirable that a water soluble product be incorporated therein. It is well known to those skilled in the art of paint manufacture that the use of such water soluble products in paint compositions tends to produce pin holes and pitting in the paint film after exposure to the weather.

A further advantage in the use of the preferred class of materials over the use of the polyhydric phenols themselves lies in their increased solubility in typical paint solvents or thinners, for example mineral spirits, which greatly facilitates and enhances their usefulness in the manufacture of paints, varnishes and the like.

While the amount of preferred class of materials employed in the specific embodiments of the invention as set forth above is 0.1% based on the weight of the total drying oil composition, the quantities employed may be varied depending on the specific composition of the coating material. Generally it is found that less than 1% of the preferred material will be sufficient. Ordinarily 0.05 to 0.50% is sufficient. It is obvious that the processes and compositions described herein may be varied widely in their details without departing from the spirit or scope of the present invention. The present invention is limited solely by the appended claims.

What is claimed is:

1. A coating composition containing a drying oil of the type which rapidly develops skin formation in the bulk condition having incorporated therein a retarder of skin formation comprising a halogenated polyhydric phenol.

2. A coating composition containing a drying oil of the type which rapidly develops skin formation in the bulk condition having incorporated therein a retarder of skin formation comprising a halogenated polyhydric phenol containing a single benzene nucleus.

3. A coating composition containing a drying oil of the type which rapidly develops skin formation in the bulk condition having incorporated therein a retarder of skin formation comprising a chlorinated polyhydric phenol.

4. A coating composition containing a drying oil of the type which rapidly develops skin formation in the bulk condition having incorporated therein a retarder of skin formation comprising a chlorinated polyhydric phenol containing a single benzene nucleus.

5. A coating composition containing a drying oil of the type which rapidly develops skin formation in the bulk condition having incorporated therein a retarder of skin formation comprising a halogenated alkylated polyhydric phenol containing a single benzene nucleus.

6. A coating composition containing a drying oil of the type which rapidly develops skin formation in the bulk condition having incorporated therein a retarder of skin formation comprising a halogenated hydroquinone.

7. A coating composition containing a drying oil of the type which rapidly develops skin formation in the bulk condition having incorporated therein a retarder of skin formation comprising a halogenated catechol.

8. A coating composition containing a drying oil of the type which rapidly develops skin formation in the bulk condition having incorporated therein a retarder of skin formation comprising dichlor hydroquinone.

9. A coating composition containing a drying oil of the type which rapidly develops skin formation in the bulk condition having incorporated therein a retarder of skin formation comprising chlor catechol.

10. A coating composition containing a drying oil of the type which rapidly develops skin formation in the bulk condition having incorporated therein a retarder of skin formation comprising chlorinated di-tertiary amyl catechol.

11. A coating composition characterized by resistance to skin formation in the bulk condition containing a drying oil of the type which rapidly develops skin formation in the bulk condition having incorporated therein a positive oxidation catalyst and a controller of oxidation thereof, having the property of substantially retarding said skinning of said coating composition without materially affecting the normal drying of the coating composition in thin film form, comprising a halogenated polyhydric phenol.

12. A coating composition characterized by resistance to skin formation in the bulk condition containing a drying oil of the type which rapidly develops skin formation in the bulk condition having incorporated therein a positive oxidation catalyst and a controller of oxidation thereof, having the property of substantially retarding said skinning of said coating composition without materially affecting the normal drying of the coating composition in thin film form, comprising a chlorinated polyhydric phenol containing a single benzene nucleus.

GEORGE D. MARTIN.